(12) United States Patent
Bonny et al.

(10) Patent No.: US 9,884,553 B1
(45) Date of Patent: Feb. 6, 2018

(54) INTEGRAL POWER DISTRIBUTION ASSEMBLY FOR ENGINE

(71) Applicant: Hydro-Gear Limited Partnership, Sullivan, IL (US)

(72) Inventors: Nathan W. Bonny, Shelbyville, IL (US); Raymond Hauser, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 14/978,342

(22) Filed: Dec. 22, 2015

Related U.S. Application Data

(63) Continuation of application No. 13/911,690, filed on Jun. 6, 2013, now Pat. No. 9,221,336, which is a continuation of application No. 13/793,984, filed on Mar. 11, 2013, now abandoned, which is a continuation-in-part of application No. 13/675,637, filed on Nov. 13, 2012, now abandoned.

(60) Provisional application No. 61/559,620, filed on Nov. 14, 2011.

(51) Int. Cl.
*B60K 25/02* (2006.01)
*B60K 17/28* (2006.01)
*F16D 67/02* (2006.01)

(52) U.S. Cl.
CPC .............. *B60K 25/02* (2013.01); *B60K 17/28* (2013.01); *F16D 67/02* (2013.01); *B60K 2025/022* (2013.01); *B60K 2025/026* (2013.01)

(58) Field of Classification Search
CPC .............. B60K 25/02; B60K 2025/022; B60K 2025/026; B60K 17/28; B60K 5/06; F16D 67/02; F16D 67/04; F16D 25/06; F16D 25/0635; F16D 25/0638; F16H 2057/02056
See application file for complete search history.

(56) References Cited

U.S. PATENT DOCUMENTS

| | | | |
|---|---|---|---|
| 2,078,034 | A | 4/1937 | Smith |
| 2,821,868 | A | 2/1958 | Gregory |
| 3,099,166 | A | 7/1963 | Schou |
| 3,470,769 | A | 10/1969 | Livezey |

(Continued)

FOREIGN PATENT DOCUMENTS

| | | |
|---|---|---|
| DE | 102010062784 | 6/2012 |
| JP | 2005263143 | 9/2005 |

(Continued)

*Primary Examiner* — Laura Freedman
(74) *Attorney, Agent, or Firm* — Neal, Gerber & Eisenberg LLP

(57) ABSTRACT

A power distribution assembly integrated into the lower engine housing of an internal combustion engine, the assembly having a drive train with a T-box output configuration and power take off driven by the crankshaft of the engine. The drive train may power the input shafts of a pair of independent, variable drive transmissions. In one embodiment, a single actuator engages a manual clutch/brake mechanism that controls the output shaft of the power take off. In other embodiments, an electric clutch affords control of the power take off mechanism. In further embodiments, a hydraulic clutch/brake assembly allows control of the power take off, and an additional hydraulic clutch assembly may be used to control the outputs of the T-box.

19 Claims, 12 Drawing Sheets

(56) References Cited

U.S. PATENT DOCUMENTS

| | | | |
|---|---|---|---|
| 3,748,851 A | 7/1973 | Hause | |
| 3,774,460 A | 11/1973 | Browning et al. | |
| 3,774,475 A * | 11/1973 | Meysenburg | F16H 37/046 475/158 |
| 3,805,641 A | 4/1974 | Hause | |
| 3,863,450 A | 2/1975 | Hause | |
| 3,971,461 A * | 7/1976 | Conroy | F16D 67/04 192/12 C |
| 4,275,607 A | 6/1981 | Snoy | |
| 4,287,778 A * | 9/1981 | Quick | B60K 17/28 192/48.614 |
| 4,633,961 A | 1/1987 | Niskanen | |
| 5,067,933 A * | 11/1991 | Hardesty | B60K 17/105 475/32 |
| 5,199,317 A * | 4/1993 | Moore | F16H 3/14 184/1.5 |
| 5,542,306 A * | 8/1996 | Fernandez | F16D 65/84 188/264 E |
| 6,142,274 A * | 11/2000 | Warner | B60K 17/28 192/12 C |
| 6,260,682 B1 * | 7/2001 | Rang | B60K 17/28 192/70.19 |
| 6,588,299 B2 | 7/2003 | Ishimori et al. | |
| 6,758,301 B2 | 7/2004 | Shiba et al. | |
| 6,779,615 B2 | 8/2004 | Boyer et al. | |
| 6,854,541 B2 * | 2/2005 | Matufuji | B60K 17/28 180/53.1 |
| 6,877,580 B2 | 4/2005 | Hasegawa et al. | |
| 6,886,646 B2 | 5/2005 | Sugimoto et al. | |
| 6,988,580 B2 | 1/2006 | Ohashi et al. | |
| 7,070,036 B2 * | 7/2006 | Fernandez | B60K 17/28 192/109 R |
| 7,137,250 B1 | 11/2006 | McCoy et al. | |
| 7,146,810 B1 * | 12/2006 | Hauser | F04B 1/22 60/486 |
| 7,152,403 B2 | 12/2006 | Yoshida | |
| 7,159,343 B2 | 1/2007 | Hanafusa et al. | |
| 7,370,714 B2 | 5/2008 | Yasuda et al. | |
| 7,392,654 B1 | 7/2008 | Hauser et al. | |
| 7,614,227 B2 | 11/2009 | Carlson et al. | |
| 7,621,353 B2 | 11/2009 | Ishii et al. | |
| 7,640,738 B1 | 1/2010 | Hauser et al. | |
| 7,673,712 B2 | 3/2010 | Iida et al. | |
| 7,739,870 B2 | 6/2010 | Carlson et al. | |
| 7,744,503 B2 | 6/2010 | Kobayashi et al. | |
| 8,313,408 B1 | 11/2012 | Langenfeld | |
| 8,393,236 B1 | 3/2013 | Hauser et al. | |
| 8,534,060 B1 | 9/2013 | Bennett et al. | |
| 8,739,905 B1 | 6/2014 | Bennett | |
| 9,045,040 B2 * | 6/2015 | Mayer | F16D 25/123 |
| 9,194,473 B1 | 11/2015 | Hauser et al. | |
| 9,221,336 B1 * | 12/2015 | Bonny | B60K 25/02 |
| 2004/0211274 A1 * | 10/2004 | Seipold | B60K 17/28 74/11 |
| 2012/0244023 A1 | 9/2012 | Nilsson et al. | |
| 2012/0270690 A1 | 10/2012 | Haglsperger et al. | |

FOREIGN PATENT DOCUMENTS

| | | |
|---|---|---|
| KR | 20110073773 | 6/2011 |
| WO | WO2011054333 | 12/2011 |

* cited by examiner

INTEGRAL POWER DISTRIBUTION ASSEMBLY FOR ENGINE

CROSS-REFERENCE TO RELATED APPLICATIONS

This application is a continuation of U.S. patent application Ser. No. 13/911,690, filed Jun. 6, 2013, now U.S. Pat. No. 9,221,336, which is a continuation of U.S. patent application Ser. No. 13/793,984, filed Mar. 11, 2013, which is a continuation-in-part of U.S. patent application Ser. No. 13/675,637, filed Nov. 13, 2012, which claims the benefit of U.S. Provisional Patent App. No. 61/559,620 filed on Nov. 14, 2011. These prior applications are incorporated by reference herein in their entirety.

BACKGROUND OF THE INVENTION

This application relates to power distribution assemblies in general, and more specifically to power distribution assemblies useful for powering independent, variable drive transmissions and an auxiliary function.

SUMMARY OF THE INVENTION

A power distribution assembly having a T-box output configuration and a power take off is disclosed herein. The power distribution assembly is integrated into the lower engine housing of an internal combustion engine to be driven by the engine crankshaft. Such an arrangement eliminates the need for a separate housing for the power distribution assembly, creating a more compact envelope for vehicle integration.

A power distribution assembly in accordance with the principles of the invention(s) disclosed herein may have a power take off with a manual clutch/brake assembly. In another embodiment, the power take off can be controlled by an electric clutch/brake assembly external to the lower engine housing. In still another embodiment, the power take off may have an electric clutch disposed internal to the lower engine housing. Other embodiments illustrate a power distribution system having a hydraulic clutch/brake assembly and the use of a second clutch to selectively engage the output of the power distribution assembly. It should be understood that references herein to the principles of the invention should be read broadly and in light of the complete disclosure in this specification and accompanying drawings, and that multiple inventions may be disclosed herein.

DETAILED DESCRIPTION OF THE DRAWINGS

Figure 1:
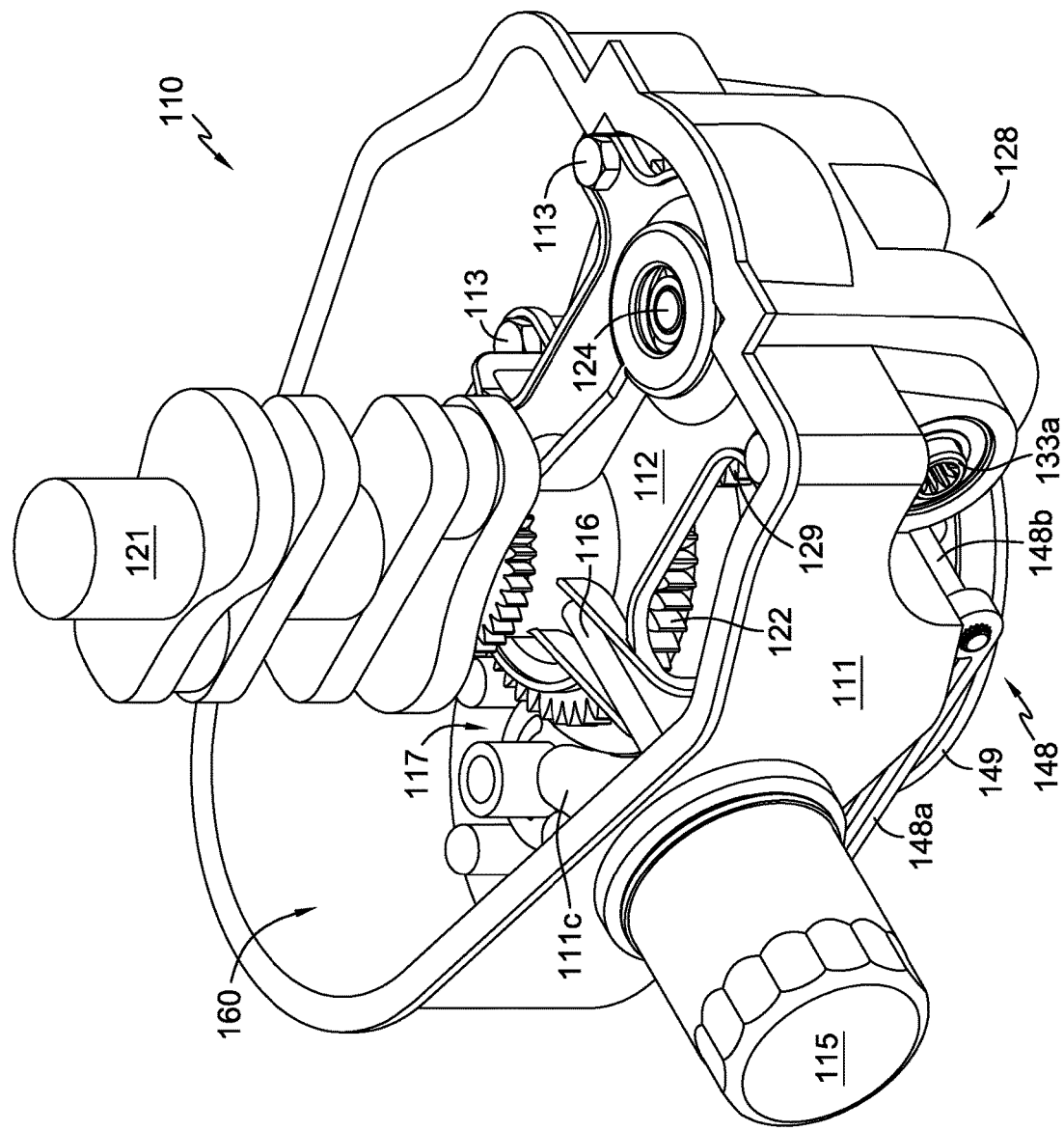
FIG. 1 is an isometric view of a first embodiment of a power distribution assembly in accordance with the principles of the invention; the power distribution assembly is integrated into the lower engine housing of an internal combustion engine with a housing component and certain engine components removed for clarity.
Figure 2:
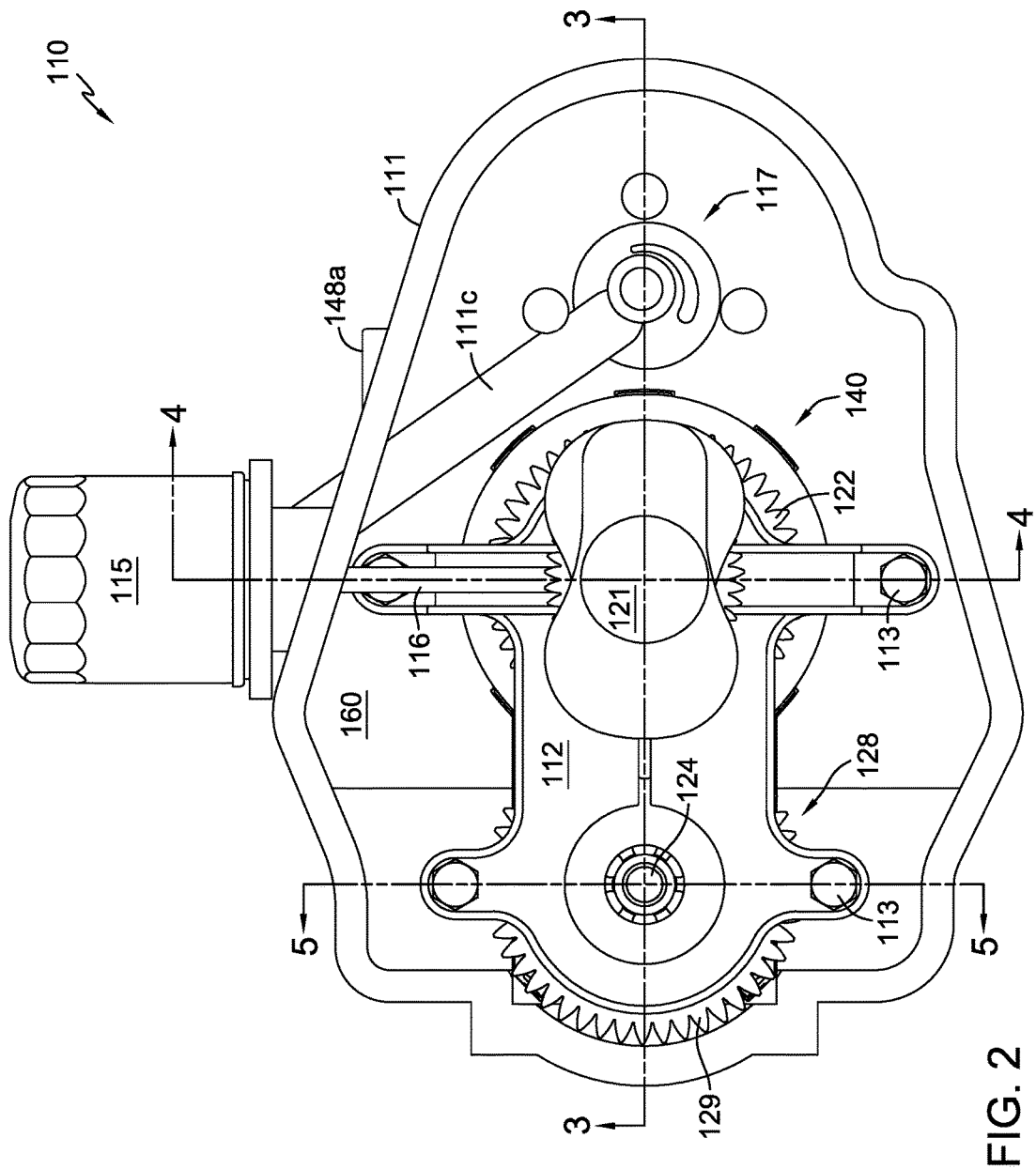
FIG. 2 is a top view of the power distribution assembly of FIG. 1.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals or serial numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the present specification is intended to be taken as a whole and interpreted in accordance with the principles of the present invention as taught herein and understood by one of ordinary skill in the art.

FIGS. 1-6 illustrate a first embodiment of a power distribution assembly 110 in accordance with the principles of the invention. The power distribution assembly 110 comprises a T-box output configuration 128 (or T-box herein) and a power take off 140 integrated into the lower engine housing 111 of an internal combustion engine 105. Power take off 140 is depicted herein as a manual clutch/brake assembly, though other power take off configurations known in the art, such as hydraulic or electric clutch/brake assemblies are contemplated within the principles of the invention. Power distribution assembly 110 is driven by the crankshaft 121 of engine 105, the crankshaft 121 distributing power to power take off 140 through engagement with cage assembly 141, and distributing power to T-box 128 through engagement with a pair of transmission gears 122, 129.

The T-box 128 of power distribution assembly 110 may drive a pair of variable drive transmissions 103a, 103b via output shafts 133a, 133b respectively. Transmissions 103a, 103b may independently power the drive wheels 108 of a utility vehicle, e.g. the zero-turn mower 101 depicted in FIG. 6. It is to be understood that the variable drive transmissions 103a, 103b mounted to vehicle frame 102 are representative only, and may be hydraulic, toroidal, friction, or mechanical drives in nature, provided the variable drive transmissions 103a, 103b are equipped with horizontal input shafts 162a, 162b for engagement to output shafts 133a, 133b, respectively, It should also be noted that the term "transmission" is being used in a broader context herein to include both transmissions and transaxles within its meaning. The specifics of power transmission in accordance with the principles of the invention will be described in detail below. Reference is also made to the disclosure of commonly owned U.S. Pat. No. 8,393,236 and U.S. Pat. No. 9,194,473. The terms of both of these references are incorporated herein in their entirety.

Figure 6:
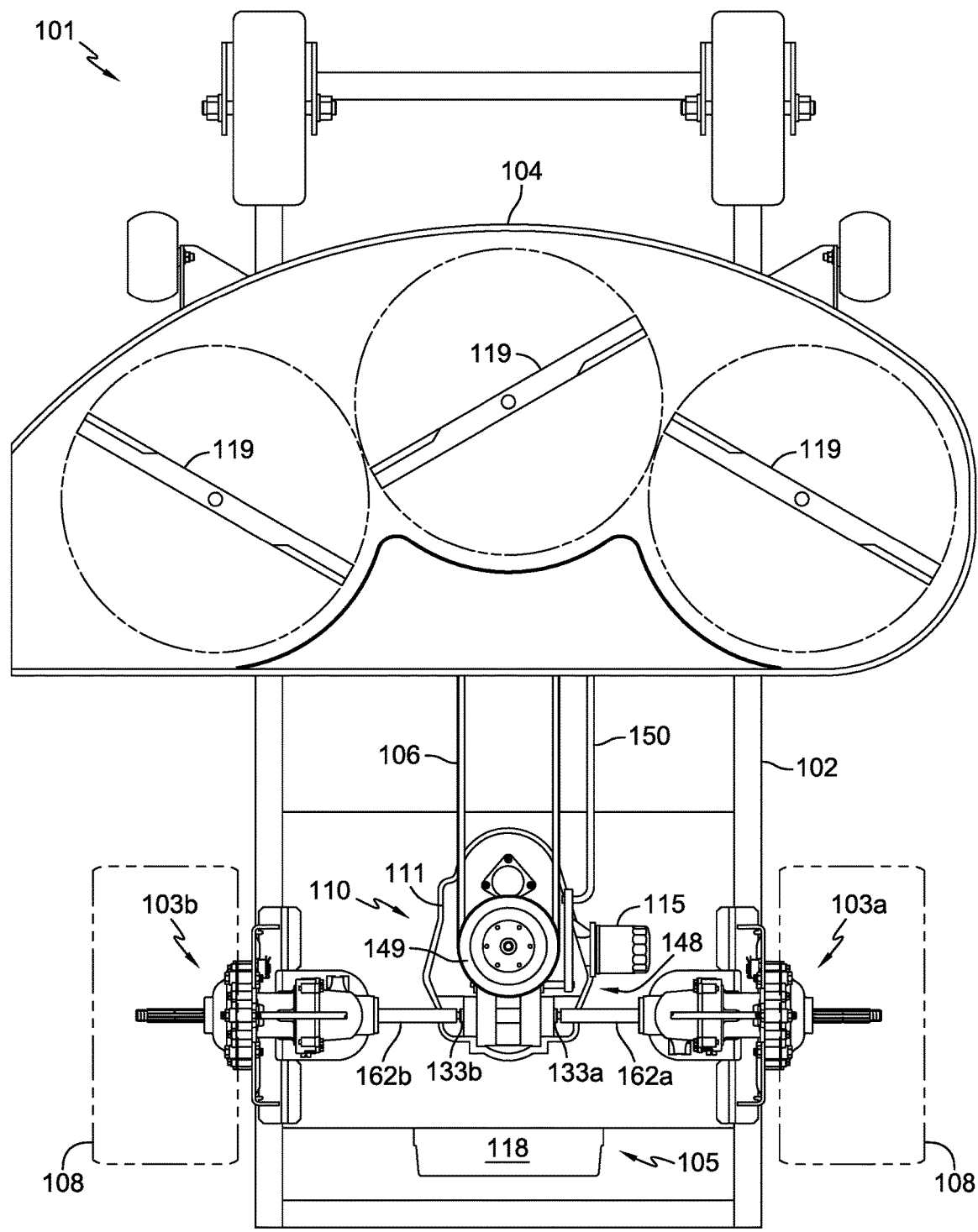
FIG. 6 is a bottom view of a vehicle integrating the power distribution assembly of FIG. 1.

Power distribution assembly 110 may also drive an auxiliary function, e.g. the mowing deck 104 of zero-turn mower 101, via the output shaft 142 of power take off 140. A belt and pulley system may be engaged to output shaft 142 to power the auxiliary function. In FIG. 6, a representative pulley 149 is shown engaged to a drive belt 106 to power mowing deck 104 upon actuation of power take off 140. The specifics of power take off actuation in accordance with the principles of the invention will be described in detail below.

Figure 4:
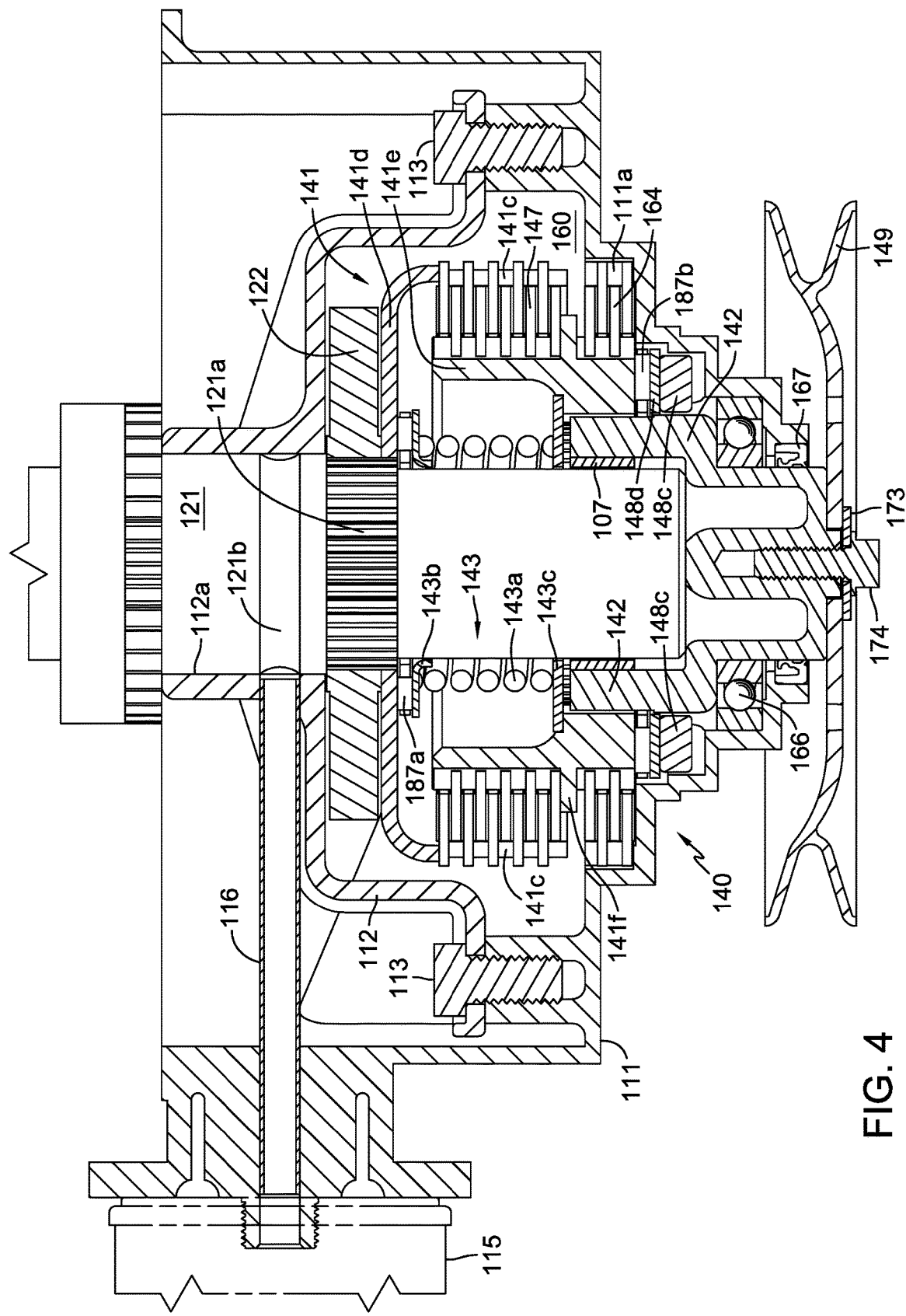
FIG. 4 is a partial section view of the power distribution assembly along the line 4-4 of FIG. 2.
Figure 5:
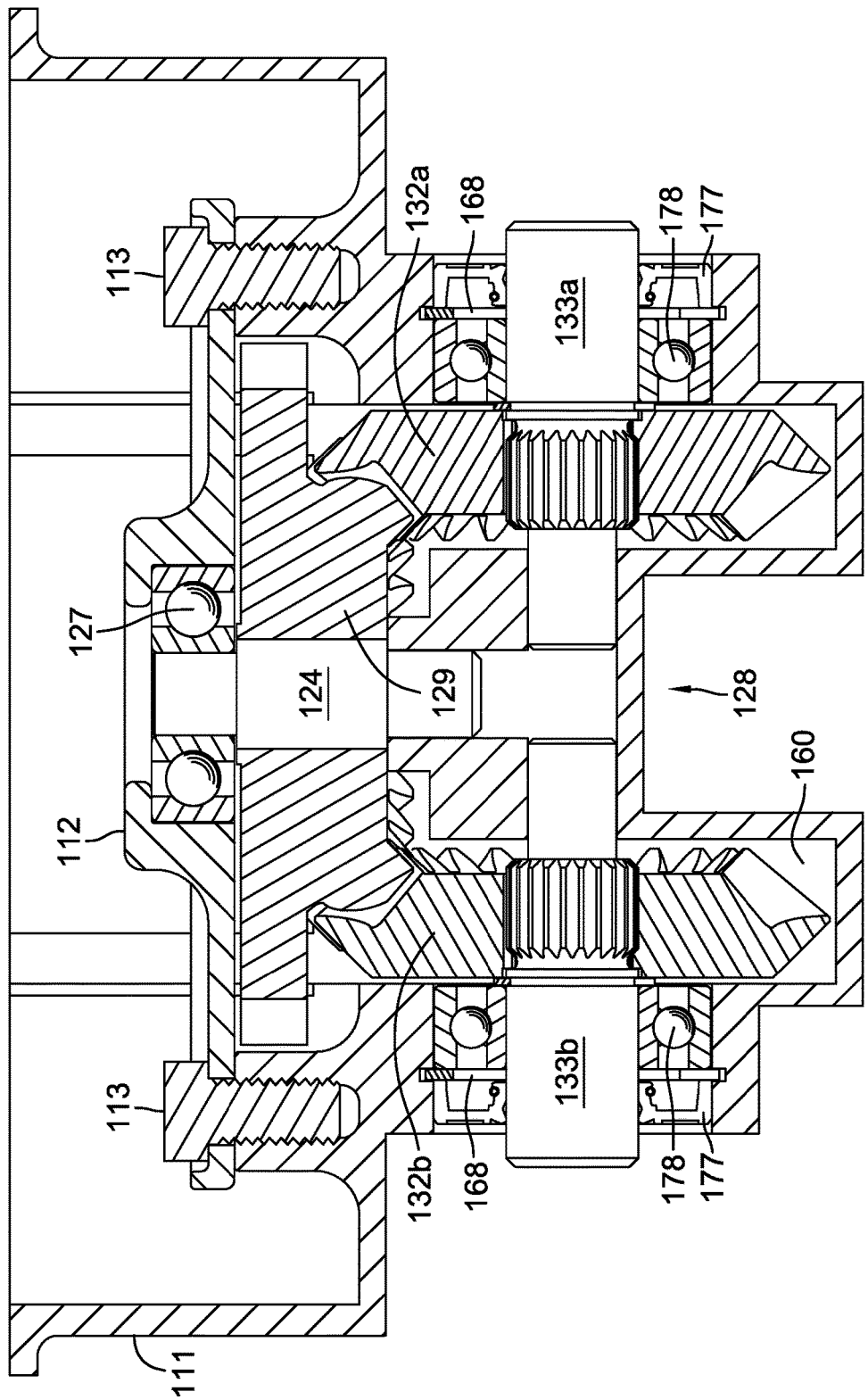
FIG. 5 is a partial section view of the power distribution assembly along the line 5-5 of FIG. 2.

Internal combustion engine 105 comprises an upper engine housing 118 joined to lower engine housing 111 to form a sump 160. The engine housings 118, 111 may be sealed in a known manner, such as the use of a gasket or liquid sealant. Crankshaft 121 extends through an opening in bridge plate 112 and has splines 121a to mesh with transmission gear 122 and outer clutch plate carrier 141d. Bridge plate 112 is attached by fasteners 113 to lower engine housing 111 to secure the components of power take off 140, and in the embodiment depicted herein the drive train, as described herein, and power take off 140 are disposed entirely within the envelope formed by the lower engine housing 111. Bridge plate 112 has a bearing surface 112a which journals crankshaft 121. It should be noted that crankshaft 121 is also rotationally supported by bushing 107 located interior to power take off output shaft 142, which in turn is supported by a bearing 166 in lower engine housing 111. Seal 167 contacts engine housing 111 and power take off output shaft 142 to retain engine oil in sump 160. Crankshaft 121 has oil groove 121b to permit lubrication of crankshaft 121. As shown in FIG. 4, pressurized oil is transported from oil filter 115 to oil groove 121b by oil tube 116. Oil is pumped to oil filter 115 through fluid passage structure 111c by an oil pump 117, which is driven by a camshaft (not shown) of internal combustion engine 105. The specifics of oil pump 117 are not shown but will be understood to be of a standard design. Other components of engine 105 are not depicted herein for clarity as such elements are generally known in the art and depiction of such standard engine components would not assist in the understanding of this invention.

Crankshaft 121 powers transmission gear 122 which drives combination gear 129 to act as a drive train. Combination gear 129 is splined to, and rotates with, an intermediate or jack shaft 124. Combination gear 129 has both a spur gear form and a bevel gear form. It should be understood that individual spur and bevel gears could in the alternative be affixed to jack shaft 124. Jack shaft 124 is rotationally supported by ball bearing 127 located in bridge plate 112 and lower engine housing 111. The bevel gear form 129a of combination gear 129 engages bevel gears 132a, 132b which are splined to output shafts 133a, 133b respectively. This bevel gear and output shaft structure, in which output shafts 133a, 133b are collinear and rotate on an axis that is generally perpendicular to the axis of rotation of crankshaft 121, forms T-box 128. The output shafts 133a, 133b rotate in opposite senses and are rotationally supported by engine housing 111 and ball bearings 178, which are retained by retaining rings 168. It will be understood that a single bevel gear and output shaft combination may be used to drive both the left and right side variable drive transmissions in the same rotational sense. Each output shaft 133a, 133b is sealed by a shaft seal 177 to retain the oil contained in sump 160, and each has a distal end extending external to engine housing 111 and a proximal end disposed internal to engine housing 111.

The output shafts 133a, 133b are illustrated with splined female ends, but could alternatively be formed with male ends. The input shafts 162a, 162b of the variable drive transmissions 103a, 103b driven by power distribution assembly 110 may be flexibly joined to output shafts 133a, 133b through the mating of coarse toothed shaft ends, male and female, wherein the male shaft end has a rounded or tapered profile. Such a flexible joint negates the effect of vehicle frame flexion on the drive system. It should be understood that other flexible joints known in the art, such as universal or Cardan joints, are contemplated within the scope of the invention. Regardless of joint configuration, power distribution assembly 110 can accommodate a variety of drive mechanisms in "plug-and-play" fashion provided the appropriate input shaft is selected. Additionally, the length of the corresponding input shafts can be varied to accommodate differences in vehicle frame widths.

Figure 3:
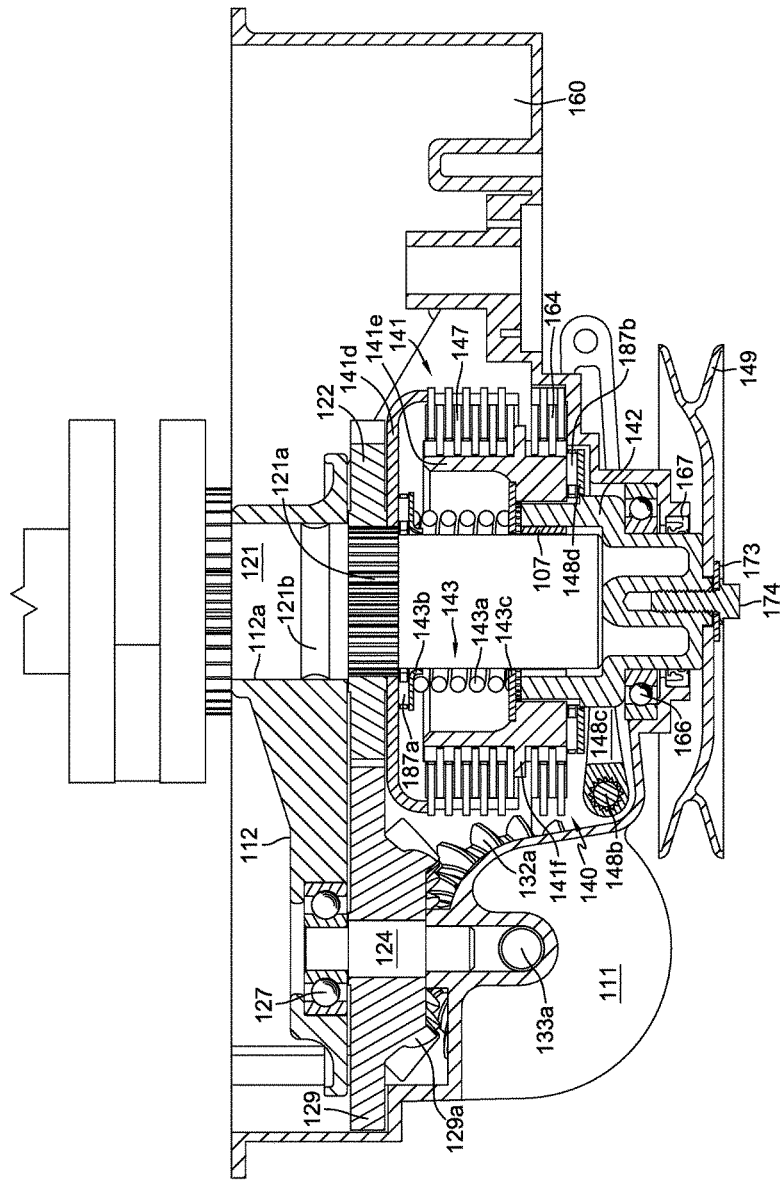
FIG. 3 is a partial section view of the power distribution assembly along the line 3-3 of FIG. 2.

As best illustrated in FIGS. 3 and 4, the power take off 140 of power distribution assembly 110 comprises a manual clutch/brake assembly powered by crankshaft 121. Clutch actuation assembly 148 controls both the clutch and the brake assemblies. For clarity, it should be noted that the clutch assembly is engaged and the brake assembly is disengaged in both FIGS. 3 and 4. Spring assembly 143 normally biases the brake assembly to the engaged position, wherein brake plates 164, located on lower engine housing 111 and inner clutch plate carrier 141e, are brought into frictional engagement. An operator disengages the brake assembly and thereafter engages the clutch assembly through manipulation of clutch actuation assembly 148. External to lower engine housing 111, an operator actuated linkage 150 may be used to rotate actuator handle 148a affixed to actuator shaft 148b. Rotation of actuator shaft 148b causes clutch actuation fork 148c to bear against washer 148d. The washer 148d acts against the spring force of spring 143a, disengaging the brake and bringing the clutch plates 147 located on outer clutch plate carrier 141d (which rotate in unison with crankshaft 121) and those located on inner clutch plate carrier 141e into frictional engagement, thereby driving power take off output shaft 142.

In particular, washer 148d pushes upward against thrust bearing 187b which also lies concentric about power take off output shaft 142. Inner clutch plate carrier 141e, having a flange 141f which engages the brake plates 164 (under influence of spring 143a) and the clutch plates 147 (under influence of clutch actuation fork 148c), is situated on thrust bearing 187b. Inner clutch plate carrier 141e is also slidably engaged to an outer gear form on power take off output shaft 142 via a corresponding gear form on the inner diameter of inner clutch plate carrier 141e. Clutch plate engagement features 141c and brake plate engagement features 111a properly locate clutch plates 147 and brake plates 164, respectively, in their stacks. The upward movement of thrust bearing 187b acts to push inner clutch plate carrier 141e upward against lower spring assembly washer 143c, compressing spring 143a against upper spring assembly washer 143b and thrust bearing 187a. The components of spring assembly 143 and thrust bearing 187a lie concentric to crankshaft 121 and are trapped between outer clutch plate carrier 141d and power take off output shaft 142. As a result, crankshaft 121 and power take off output shaft 142 rotate as a unit to drive an output device such as pulley 149, which is retained on power take off output shaft 142 by a washer 173 and fastener 174. Pulley 149 may be used to drive auxiliary devices such as the mowing deck 104 of zero-turn mower 101, or the auger of a snow thrower (not shown). While the inclusion of a brake on the power take off mechanism has safety advantages for the vehicle operator, such as reducing the stopping time of mowing blades 119 on mowing deck 104, it is to be understood that the invention contemplates a power take off mechanism having a clutch alone.

Figure 7:
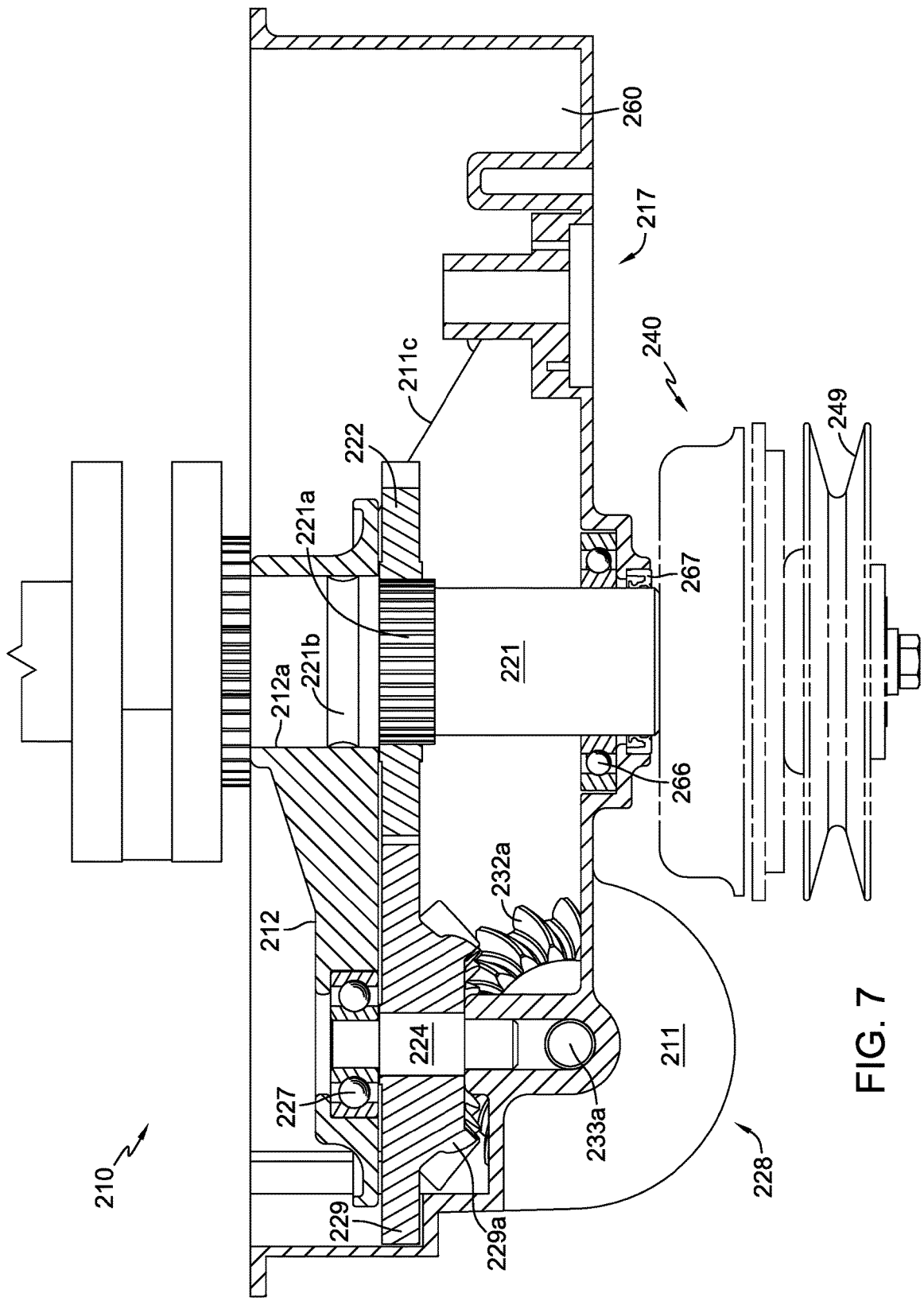
FIG. 7 is a partial section view of a second embodiment of a power distribution assembly in accordance with the principles of the invention, the section being similar to that depicted in FIG. 3, but having an electric clutch/brake external to the lower engine housing.

FIG. 7 illustrates a second embodiment of a power distribution assembly in accordance with the principles of the invention. Power distribution assembly 210 is similar to power distribution assembly 110; however, the manual, clutch/brake assembly internal to the lower engine housing has been replaced by an electric clutch/brake assembly 240 external to lower engine housing 211. It should be noted that crankshaft 221 will require additional length (not shown) as compared to crankshaft 121 to be received by electric clutch/brake assembly 240. Electric clutch/brake assembly 240 alternately arrests rotation of pulley 249, which is fixed to a power take off output shaft (not shown), and couples pulley 249 to the rotation of crankshaft 221. The rotation of the field back plate of electric clutch/brake assembly 240 can be restrained by any method commonly known in the art such as fixing the plate to a vehicle's frame (not shown) or the lower engine housing 111 with an additional flat piece of metal (not shown). The structure and function of such electric clutch/brake assemblies is well known in the art and will not be described further herein.

Rotational support for crankshaft 221 is provided by a bearing surface 212a on bridge plate 212 that journals the crankshaft 221, and a bearing 266 located at the base of lower engine housing 211. A shaft seal 267 directly engages crankshaft 221 adjacent bearing 266 to prevent leakage of oil from sump 260. The structure and function of the crankshaft's splines 221a and oil groove 221b are identical to that described for power distribution assembly 110. Similarly, the structure and function of T-box 228 is identical to that of T-box 128, while the structure and function of oil pump 217 is identical to that oil pump 117. Thus, power distribution assembly 210 will not be described further herein.

Figure 8:
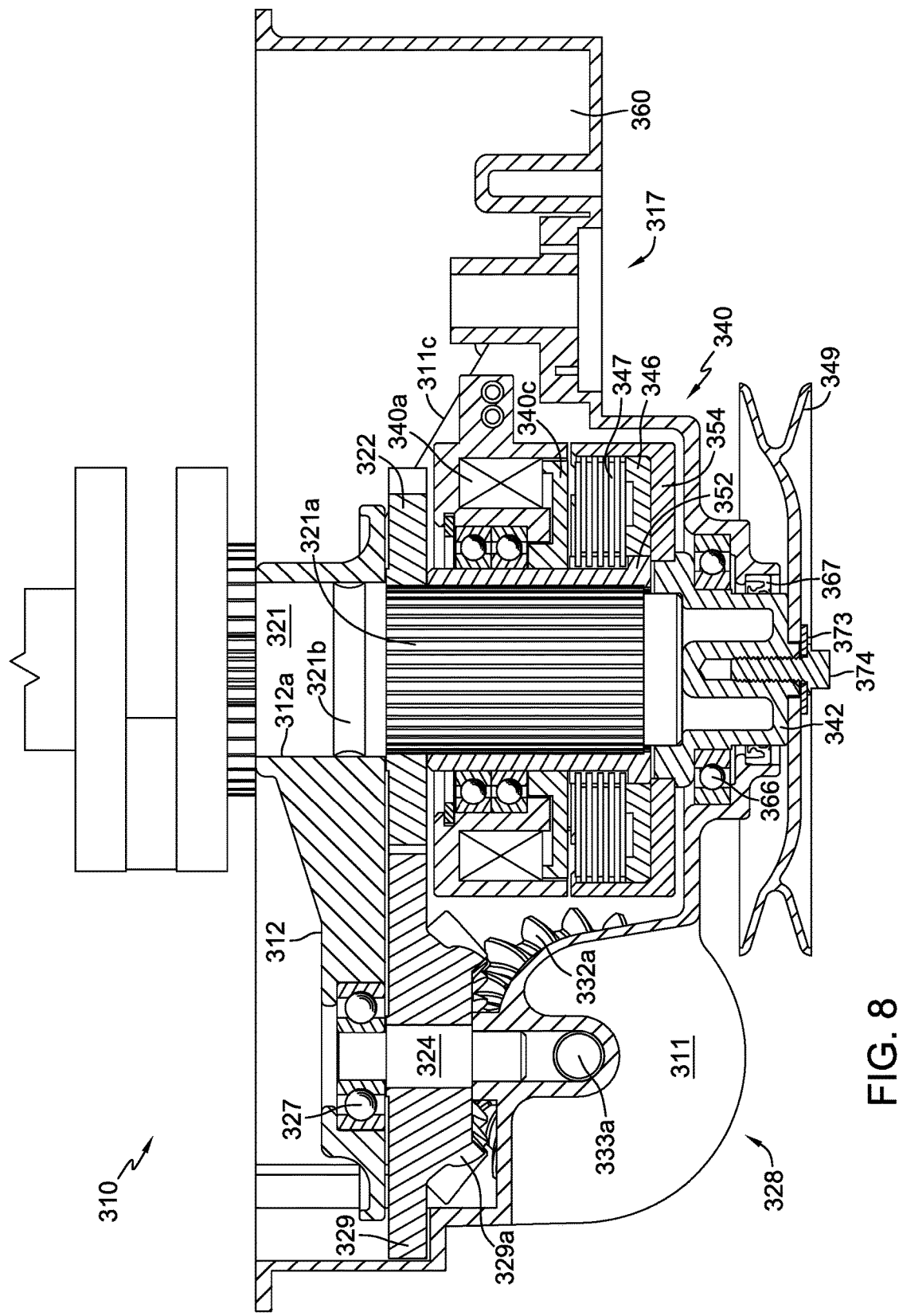
FIG. 8 is a partial section view of a third embodiment of a power distribution assembly in accordance with the principles of the invention, the section being similar to that depicted in FIG. 3, but having an electric clutch internal to the lower engine housing.

FIG. 8 depicts a third embodiment of a power distribution assembly in accordance with the principles of the invention. Power distribution assembly 310 is similar to power distribution assembly 210; however, power distribution assembly 310 has an electric clutch assembly 340 located internal to lower engine housing 311, i.e. a wet clutch design. Electric clutch assembly 340 has field coil 340a which is energized by a power source, e.g. the alternator (not shown) of the internal combustion engine, via an electrical connector (not shown). When field coil 340a is energized, armature 340c is magnetized and clutch piston 346 is attracted thereto. The stack-up of clutch plates 347 consists of one set that is captured by a gear form (not shown) native to outer clutch plate carrier 354 and an interwoven set that is captured by a gear form native to inner clutch plate carrier 352. Inner clutch plate carrier 352 is engaged to and rotates with crankshaft 321 under power from the internal combustion engine, the splines 321a being elongated to fully engage inner clutch plate carrier 352 along its length. Outer clutch plate carrier 354 is engaged to power take off output shaft 342, to selectively rotate with it upon actuation of electric clutch assembly 340. Clutch plates 347 are advantageously faced with a friction layer (not shown); for example, a nonwoven cellulosic with binder. The movement of the clutch plates 347 is restricted vertically by armature 340c. Thus, movement of clutch piston 346 toward armature 340c places clutch plates 347 into frictional engagement. As a result, power take off output shaft 342 is rotated synchronously with crankshaft 321. Power take off output shaft 342 is rotatably supported in lower engine housing 311 by bearing 366. It should be noted that shaft seal 367 is incorporated to prevent leakage of oil from sump 360. A pulley 349 may be fixed to output shaft 342 by a washer 373 and fastener 374 to selectively drive an implement (not shown) by means of a drive belt (not shown). The structure and function of T-box 328 is identical to that of T-box 228, and the structure and function of oil pump 317 is identical to that of oil pump 217. Thus, power distribution assembly 310 will not be further described herein.

Figure 9:
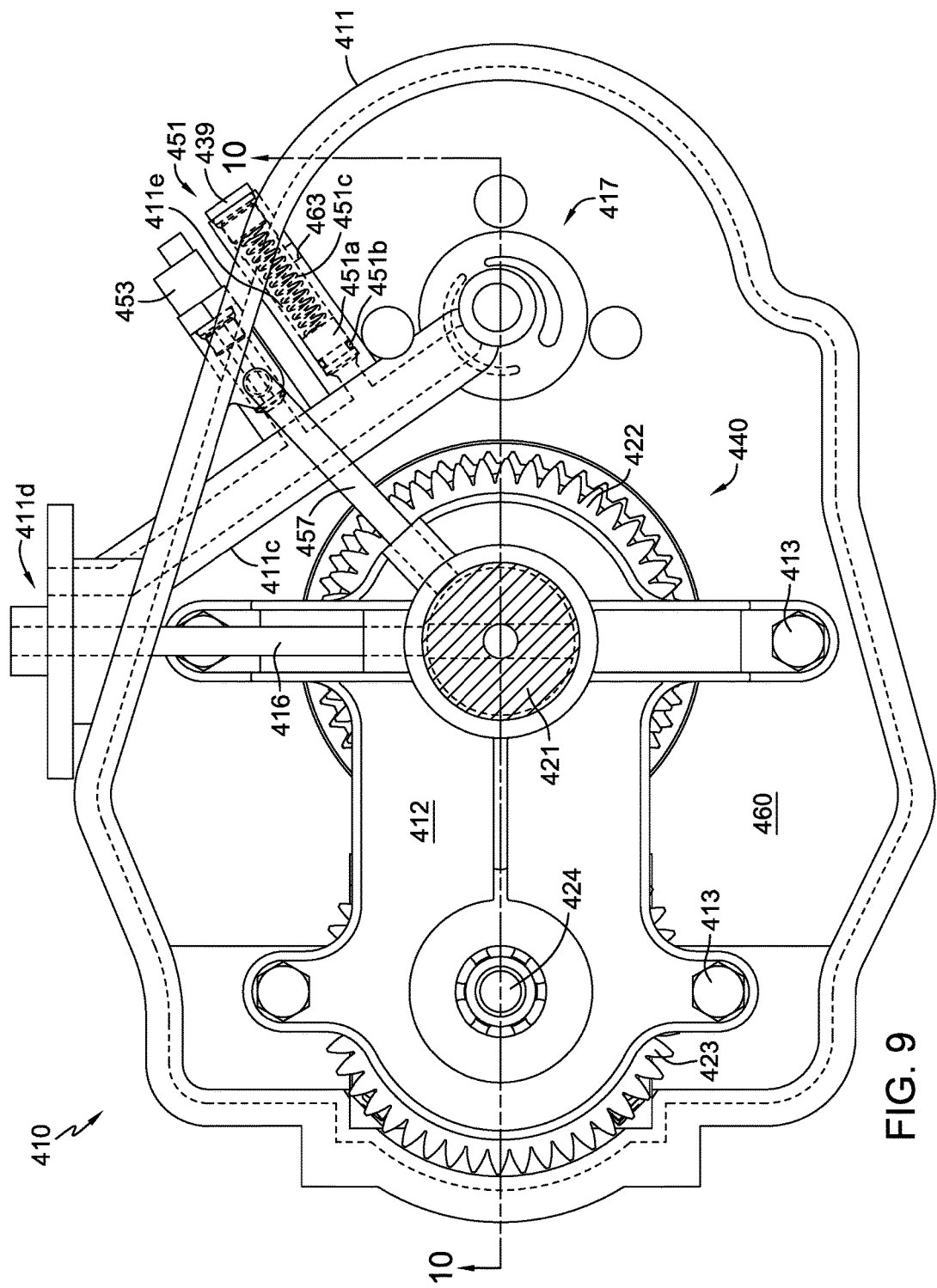
FIG. 9 is a top view of a fourth embodiment of a power distribution assembly in accordance with the principles of the invention.
Figure 10:
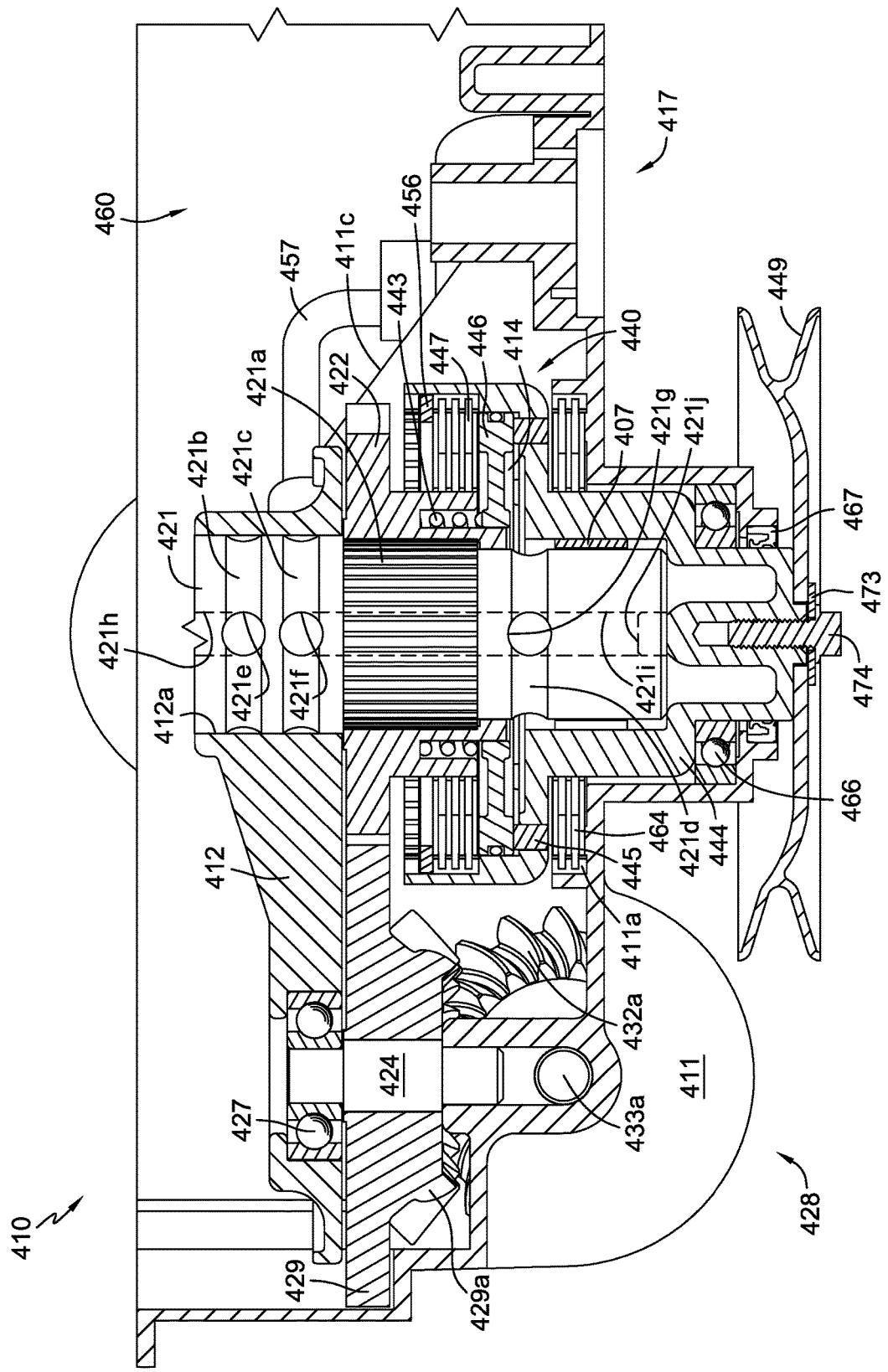
FIG. 10 is a partial section view of the power distribution assembly of FIG. 9 along the line 10-10 of FIG. 9.

FIGS. 9 and 10 depict a fourth embodiment of a power distribution assembly in accordance with the principles of the invention. Power distribution assembly 410 is similar to power distribution assembly 110; however, the clutch/brake assembly 440 controlling the power take off is hydraulically actuated as described in detail below.

Oil pump 417 supplies hydraulic fluid from sump 460 to fluid passage 411c, which is in fluid communication with an accumulator 451, a clutch actuation valve 453, and an oil filter (not shown) through which hydraulic fluid passes prior to lubricating crankshaft 421. Accumulator 451 acts as a source of reserve fluid for clutch/brake assembly 440 and also serves to dampen the effect of actuating clutch/brake assembly 440; assuring that an adequate volume of hydraulic fluid is available to supply clutch/brake assembly 440 without reducing the availability of hydraulic fluid for lubrication purposes. This reduces wear on the components of clutch/brake assembly 440 and crankshaft 421, while smoothing out the operation of the power take off assembly. Accumulator 451 is located in an accumulation chamber 411e sealed with a treaded plug 439 external to lower engine housing 411. Accumulator 451, which comprises a piston 451a, o-ring 451b, and spring 451c, reacts to changing hydraulic fluid volumes in fluid passage 411c. An equilibration passage 463 is provided to allow free movement of piston 451a, permitting fluid or air trapped behind piston 451a to pass through to sump 460.

Clutch actuation valve 453, depicted herein as an electromechanical solenoid valve, is under operator control and permits pressurized hydraulic fluid from fluid passage 411c to actuate hydraulic clutch/brake assembly 440 when opened. It should be noted that other valve types, such as a manually actuated valve, are also contemplated within the scope of the invention. Actuation of valve 453 permits pressurized hydraulic fluid to flow through tube 457 into an inlet oil groove 421c formed in crankshaft 421. As shown in FIG. 10, pressurized oil flows from inlet oil groove 421c through cross passage 421f into vertical passage 421i, which is plugged at the end of crankshaft 421 with plug 421j.

Pressurized hydraulic fluid flows through cross passage 421g into outlet oil groove 421d and from there into volume 414 below piston 446.

In the absence of pressurized fluid, clutch spring 443 acts against piston 446 to force a plurality of pins 445 into contact with piston 446, thereby compressing brake disks 464 into frictional engagement with each other, arresting any rotation of combination clutch cage and output shaft 444. One set of the brake disks 464 is fixed to lower engine housing 411, and the intervening set of brake disks 464 is fixed to combination clutch cage and output shaft 444 by a gear form native to combination clutch cage and output shaft 444. As pressurized fluid fills volume 414, piston 446 acts against and overcomes the spring force of clutch spring 443. Consequently, pins 445 no longer act to compress brake disks 464 into frictional engagement, permitting combination clutch cage and output shaft 444 to rotate freely. As pressurized fluid continues to fill volume 414, piston 446 begins to act against clutch plates 447, compressing the clutch plates 447 into frictional engagement. The stack-up of clutch plates 447 consists of one set that is captured by a gear form (not shown) native to the combination clutch cage and output shaft 444 and an interwoven set that is captured by a gear form native to transmission gear 422, turning continuously therewith. The movement of the clutch plates 447 are restricted vertically by retaining ring 456, permitting frictional engagement to occur. As the engagement of the clutch plates 447 reaches maximum effect, with transmission gear 422 being splined to crankshaft 421, the rotation of crankshaft 421 is imparted to combination clutch cage and output shaft 444. A bearing 466 rotationally supports combination clutch cage and output shaft 444 in lower engine housing 411, while a shaft seal 467 acts directly on combination clutch cage and output shaft 444 to prevent the loss of hydraulic fluid from sump 460. As with the other embodiments described herein, a pulley 449 may be fixed to combination clutch cage and output shaft 444 by a washer 473 and fastener 474 to selectively drive an implement (not shown) by means of a drive belt (not shown).

When valve 453 is closed, the flow of pressurized hydraulic fluid to the clutch is curtailed and the fluid accumulated in volume 414 returns to sump 460 through various spaces associated with component tolerances. As a result, the brake arrests movement of combination clutch cage and output shaft 444 as described above. A bushing 407 rotationally supports the lower end of crankshaft 421 in combination clutch cage and output shaft 444.

Crankshaft 421 has oil groove 421b formed therein to permit lubrication of crankshaft 421. As shown in FIG. 9, pressurized oil is transported from an oil filter (not shown) seated on filter mount 411d through oil tube 416, oil groove 421b, and then through cross passage 421e into vertical fluid passage 421h. The structure and function of T-box 428 is identical to that of T-box 128, and the structure and function of oil pump 417 is identical to oil pump 117. Thus, power distribution assembly 410 will not be further described herein.

Figure 11:
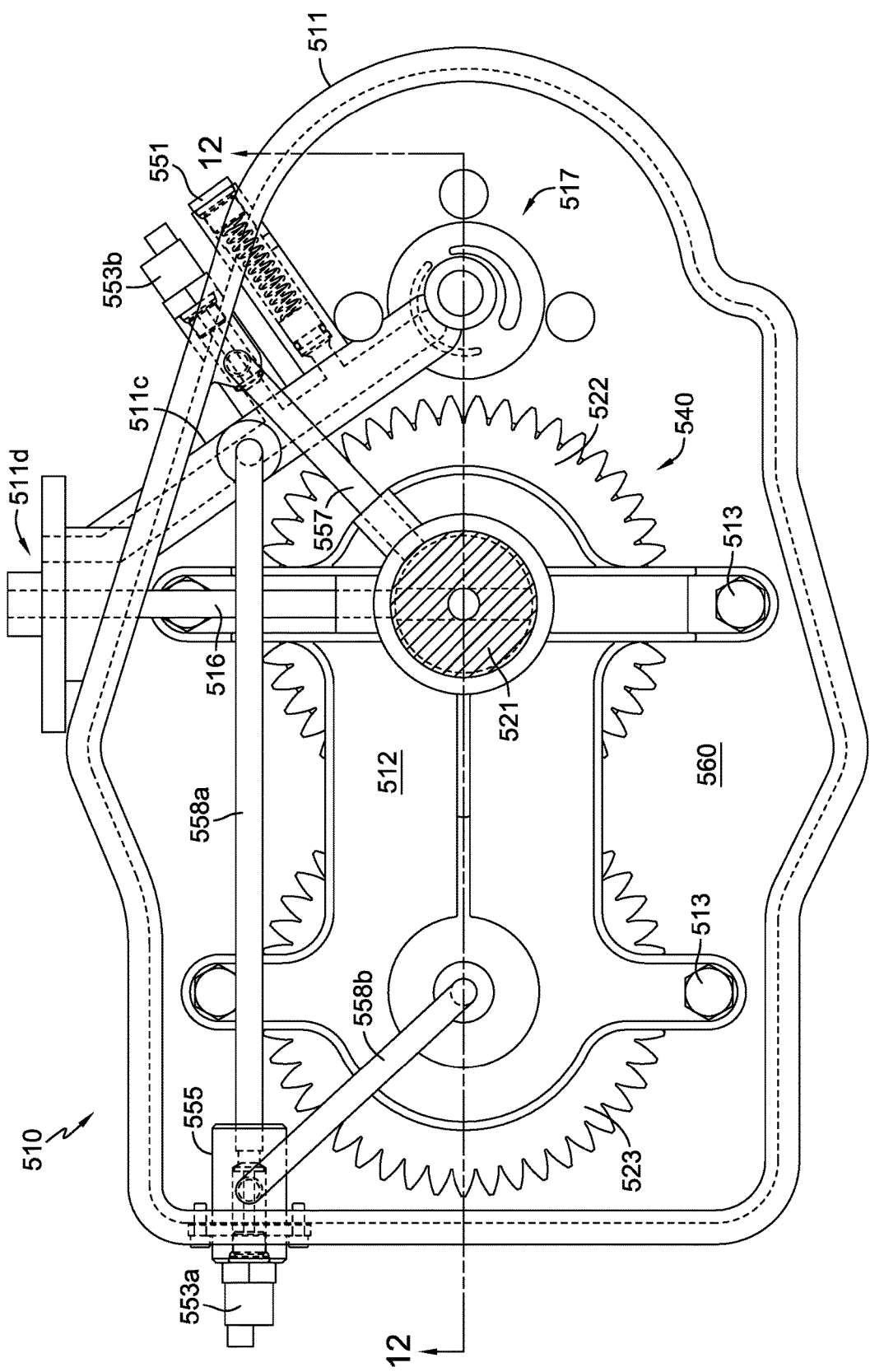
FIG. 11 is a top view of a fifth embodiment of a power distribution assembly in accordance with the principles of the invention.
Figure 12:
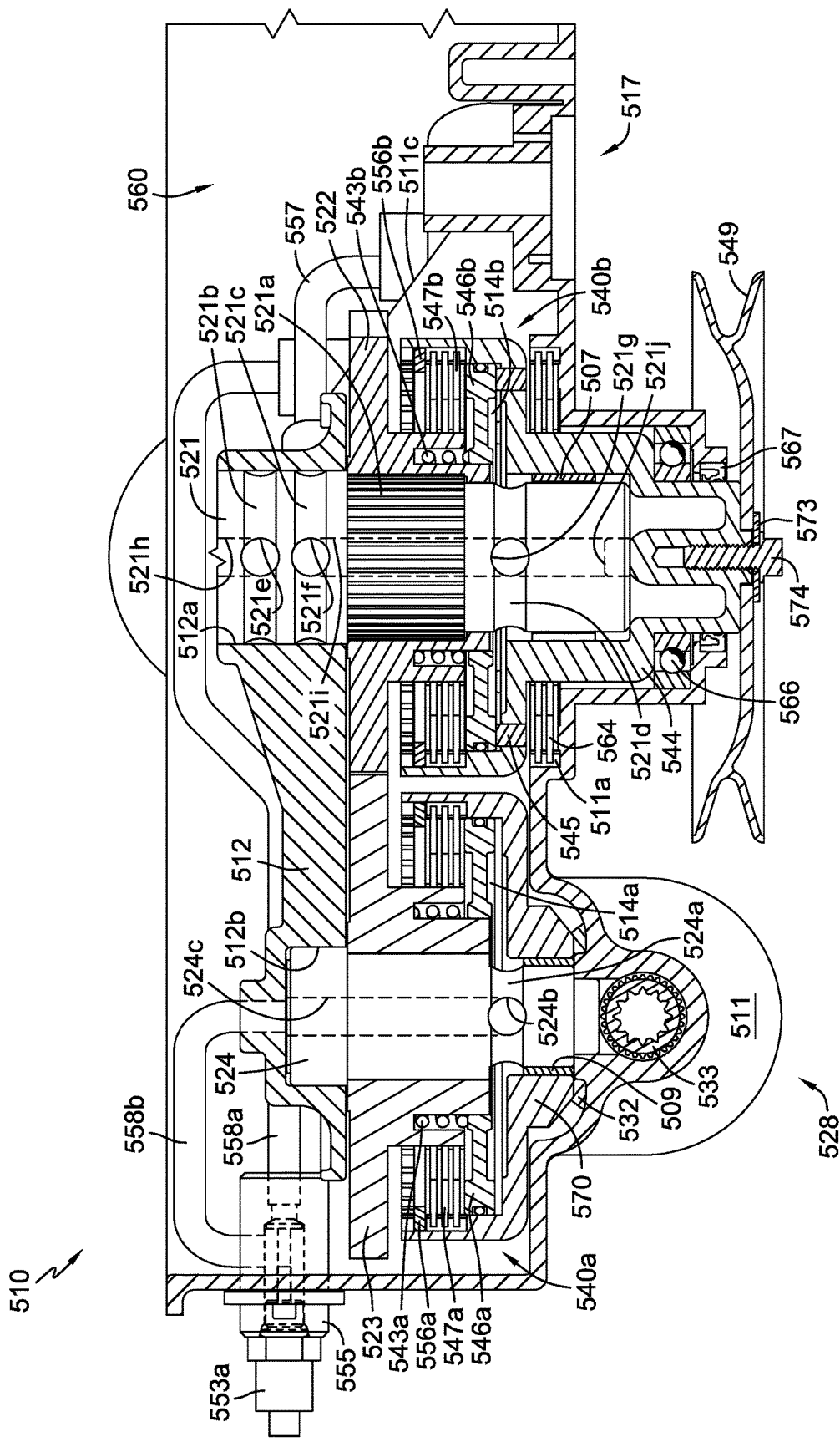
FIG. 12 is a partial section view of the power distribution assembly of FIG. 11 along the line 12-12 of FIG. 11.

FIGS. 11 and 12 depict a fifth embodiment of a power distribution assembly in accordance with the principles of the invention. Power distribution assembly 510 is similar to power distribution assembly 410, but varies in that power distribution assembly 510 includes a separate, hydraulically actuated clutch 540a to selectively drive T-box 528. In addition, T-box 528 varies from the configuration present in the previously disclosed T-boxes 128, 228, 328, 428 by having a single output shaft 533 replace the individual right and left-side outputs. Consequently, the right and left-side outputs of T-box 528 rotate in the same direction, not opposite directions. It is to be understood that both of these T-box configurations may be used with any of the power distribution assemblies disclosed herein. The structure and function of the remaining portions of power distribution assembly 510 are identical to those of power distribution assembly 410 and will not be discussed, including without limitation power take off clutch/brake assembly 540b. It should be noted that the need for an accumulator 551 in the hydraulic circuit of power distribution assembly 510 is even greater than that of power distribution assembly 410, as the demand on the output of oil pump 517 will increase in the event both clutch actuation valves 553a, 553b are opened.

Transmission gear 523 is rotatably supported on jack shaft 524 and constantly rotates based on its toothed engagement to transmission gear 522, provided crankshaft 521 is under power. Transmission gear 523 has a gear form used to capture a first set of the clutch plates 547a which constantly rotate with transmission gear 523. A second, interlaced set of the clutch plates 547a is captured by a gear form on combination (bevel) gear/cage 570. Combination gear/cage 570 is rotationally supported on jack shaft 524 by a bushing or bearing 509. A clutch spring 543a biases piston 546a away from engagement with the stack-up of clutch plates 547a. In this non-engaged state, combination gear/cage 570 does not provide a driving force to a corresponding bevel gear 532 fixed to output shaft 533.

Clutch actuation valve 553a, depicted herein as an electro-mechanical solenoid valve, is under operator control and permits pressurized hydraulic fluid flowing from fluid passage 511c through tube 558a to actuate hydraulic clutch assembly 540a when opened. As one of skill in the art will appreciate, the electro-mechanical solenoid valve 553a depicted herein is representative only, and can be one of several types of valves, including without limitation a manually actuated valve. Valve 553a is disposed in a mounting adapter 555 to ease assembly, the mounting adapter 555 capturing an end of tube 558a upon installation. Mounting adapter 555 eliminates the need for a separate mounting boss to be formed in lower engine housing 511 to accommodate valve 553a. Actuation of valve 553a permits pressurized hydraulic fluid to flow through tube 558b and into fluid passage 524c, which extends vertically through jack shaft 524. It should be noted that as compared to jack shaft 424, the width of jack shaft 524 has been enlarged to accommodate fluid passage 524c. As shown in FIG. 12, pressurized oil flows from fluid passage 524c through cross passage 524b into outlet oil groove 524a. Pressurized hydraulic fluid then flows from outlet oil groove 524a into volume 514a below piston 546a.

The flow of pressurized hydraulic fluid to volume 514a counteracts the spring force of clutch spring 543a to force piston 546a against a plurality of clutch plates 547a. The frictional engagement of the clutch plates 547a thereby attained places combination gear/cage 570 into synchronous rotation with transmission gear 523 about jack shaft 524. Bevel gear 532, which is rotationally mated to combination gear/cage 570, then drives output shaft 533. When valve 553a is closed, the flow of pressurized hydraulic fluid to the clutch assembly 540a is curtailed and the fluid accumulated in volume 514a returns to sump 560 through various spaces associated with component tolerances. As a result, the powered rotation of output shaft 533 is ceased. The multiple embodiments of the power distribution assemblies 210, 310, 410 and 510 could also be used in place of power distribution assembly 110 in FIG. 6.

While specific embodiments have been described in detail, it will be appreciated by those skilled in the art that various modifications and alternatives to those presented herein could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A power distribution assembly comprising:
   a housing comprising a first engine housing joined to a second engine housing to form a sump;
   an engine having a crankshaft, wherein the engine and the crankshaft are disposed in the housing;
   a clutch mechanism disposed in the housing, the clutch mechanism comprising:
      a rotatable outer carrier configured to be driven by the crankshaft;
      one or more clutch plates secured to the outer carrier;
      one or more brake plates secured to the housing;
      a rotatable inner carrier configured to occupy a first position where the inner carrier is engaged with the one or more clutch plates and a second position where the inner carrier is engaged with the one or more brake plates;
      a spring biasing the inner carrier away from the first position and toward the second position;
      a rotatable shaft driven by the inner carrier; and
      an actuator assembly having a first end disposed inside the housing and a second end disposed external to the housing, the actuator assembly configured to occupy a resting position and an active position, wherein in the resting position, the actuator assembly is disengaged from the inner carrier, and in the active position, the actuator assembly is engaged with the inner carrier to oppose the bias of the spring and retain the inner carrier in the first position.

2. The power distribution assembly of claim 1, wherein the spring is disposed about the crankshaft.

3. The power distribution assembly of claim 2, wherein in the resting position, the actuator assembly enables the spring to retain the inner carrier in the second position.

4. The power distribution assembly of claim 1, wherein the outer carrier and the one or more clutch plates are configured to rotate in unison with the crankshaft.

5. The power distribution assembly of claim 4, wherein the rotatable shaft is configured to rotate in unison with the inner carrier.

6. The power distribution assembly of claim 5, wherein the inner carrier is configured to rotate in unison with the crankshaft when occupying the first position.

7. The power distribution assembly of claim 6, wherein the inner carrier is configured to arrest rotation of the rotatable shaft when occupying the second position.

8. The power distribution assembly of claim 1, wherein the actuator assembly comprises a rotatable actuator handle, an actuator shaft affixed to the actuator handle, and an actuator fork affixed to the actuator shaft, wherein rotation of the actuator handle induces rotation of the actuator shaft, which induces rotation of the actuator fork, and wherein rotation of the actuator fork applies a counter force against the inner carrier.

9. The power distribution assembly of claim 8, wherein the applied counter force opposes the bias of the spring and motivates the inner carrier toward the first position.

10. The power distribution assembly of claim 9, wherein the actuator assembly further comprises a thrust bearing disposed between the actuator fork and the inner carrier such that the counter force is applied against the inner carrier at least via the thrust bearing.

11. The power distribution assembly of claim 10, wherein when the actuator assembly occupies the active position, the thrust bearing directly contacts the inner carrier.

12. The power distribution assembly of claim 10, wherein the thrust bearing is disposed about the rotatable shaft.

13. The power distribution assembly of claim 1, further comprising a transmission gear splined to the crankshaft above the outer carrier.

14. The power distribution assembly of claim 1, wherein the inner carrier comprises a flange disposed between the one or more clutch plates and the one or more brake plates.

15. The power distribution assembly of claim 14, wherein when the inner carrier occupies the first position, at least one of the one or more clutch plates applies a torque to the flange of the inner carrier and the inner carrier carries the torque toward the rotatable shaft.

16. A power distribution assembly, comprising:
   a prime mover disposed in a housing;
   a first rotatable shaft disposed in the housing, wherein the first rotatable shaft is an engine crankshaft driven by the prime mover;
   a clutch mechanism disposed in the housing, the clutch mechanism comprising:
      one or more clutch plates configured to be driven by the first rotatable shaft;
      a rotatable carrier configured to occupy a first position where the carrier is engaged with the one or more clutch plates and a second position where the carrier is disengaged from the one or more clutch plates;
      a second rotatable shaft driven by the carrier;
      a spring biasing the carrier away from the first position and toward the second position;
      an actuator assembly configured to occupy a resting position and an active position, wherein the actuator assembly comprises a rotatable actuator handle, an actuator shaft affixed to the actuator handle, and an actuator fork affixed to the actuator shaft, wherein rotation of the actuator handle induces rotation of the actuator shaft, which induces rotation of the actuator fork, and wherein rotation of the actuator fork applies a counter force against the carrier, which opposes the bias of the spring and motivates the carrier toward the first position; and
      wherein in the resting position, the actuator assembly is disengaged from the carrier, and in the active position, the actuator assembly is engaged with the carrier to oppose the bias of the spring.

17. The power distribution assembly of claim 16, wherein in the active position, the actuator assembly causes the carrier to occupy the first position, and in the resting position, the actuator assembly enables the spring to retain the carrier in the second position.

18. The power distribution assembly of claim 16, wherein the actuator handle rotates in a first plane, the actuator shaft rotates in a second plane, and the actuator fork rotates in a third plane, the first plane, the second plane, and the third plane being parallel.

19. A power distribution assembly comprising:
   an engine disposed in a housing;
   a crankshaft driven by the engine and disposed in the housing;
   a clutch mechanism disposed in the housing, the clutch mechanism comprising:

a rotatable outer carrier configured to be driven by the crankshaft;

one or more clutch plates secured to the outer carrier such that the one or more clutch plates are configured to be driven by the crankshaft;

one or more brake plates secured to the housing;

a rotatable inner carrier configured to occupy a first position where the inner carrier is engaged with the one or more clutch plates and a second position where the inner carrier is engaged with the one or more brake plates;

a spring biasing the inner carrier away from the first position and toward the second position, the spring being placed to be disposed about the crankshaft;

a rotatable shaft driven by the inner carrier; and an actuator assembly having a first end disposed inside the housing and a second end disposed external to the housing, the actuator assembly configured to occupy a resting position and an active position, wherein in the resting position, the actuator assembly is disengaged from the inner carrier, and in the active position, the actuator assembly is engaged with the inner carrier to oppose the bias of the spring and retain the inner carrier in the first position.

* * * * *